US 12,379,473 B2

(12) United States Patent
Hayashi et al.

(10) Patent No.: US 12,379,473 B2
(45) Date of Patent: Aug. 5, 2025

(54) OBJECT DETECTION APPARATUS

(71) Applicant: TOYOTA JIDOSHA KABUSHIKI KAISHA, Toyota (JP)

(72) Inventors: Yusuke Hayashi, Susono (JP); Taichi Kawanai, Susono (JP); Sadayuki Abe, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 987 days.

(21) Appl. No.: 17/483,186

(22) Filed: Sep. 23, 2021

(65) Prior Publication Data

US 2022/0137196 A1 May 5, 2022

(30) Foreign Application Priority Data

Oct. 29, 2020 (JP) .................... 2020-181693

(51) Int. Cl.
*G01S 7/497* (2006.01)
*G01S 17/04* (2020.01)
*G01S 17/86* (2020.01)

(52) U.S. Cl.
CPC .............. *G01S 7/497* (2013.01); *G01S 17/04* (2020.01); *G01S 17/86* (2020.01)

(58) Field of Classification Search
CPC .......... G01S 7/497; G01S 17/86; G01S 17/04; G01S 17/931; G01S 7/4972; G01S 17/89; G01S 17/88; H04N 23/00
USPC ...................................... 356/4.01
See application file for complete search history.

(56) References Cited

U.S. PATENT DOCUMENTS 9,875,557 B2 * 1/2018 Napier .................... G01S 7/497
2008/0118143 A1 * 5/2008 Gordon ................... G06T 7/521
382/154
2020/0191927 A1 6/2020 Lin

FOREIGN PATENT DOCUMENTS

CN 111435162 A 7/2020
JP 2002-031528 A 1/2002
JP 2020-098151 A 6/2020

OTHER PUBLICATIONS

Seigo Ito, et al., "Localization Method based on Small Imaging LIDAR and DCNN", Information Processing Society of Japan, The 79th National Convention Lecture Proceedings, Mar. 16, 2017; p. 3-27-p. 3-28; Full Translation pp. 1-5.

* cited by examiner

*Primary Examiner* — Daniel L Murphy
(74) *Attorney, Agent, or Firm* — Sughrue Mion, PLLC

(57) ABSTRACT

The object detection apparatus detects an object target by using the LIDAR and the camera. The object detection apparatus includes a calibration processing unit that is configured to perform calibration of the LIDAR and the camera. The LIDAR includes a light reception element configured to receive reflection light of irradiated laser light and reflection light of ambient light which is light other than the laser light and to detect an intensity of the received reflection light of the ambient light. The calibration processing unit is configured to perform the calibration, based on a result of light reception of the received reflection light of the ambient light and the camera image captured by the camera.

3 Claims, 4 Drawing Sheets

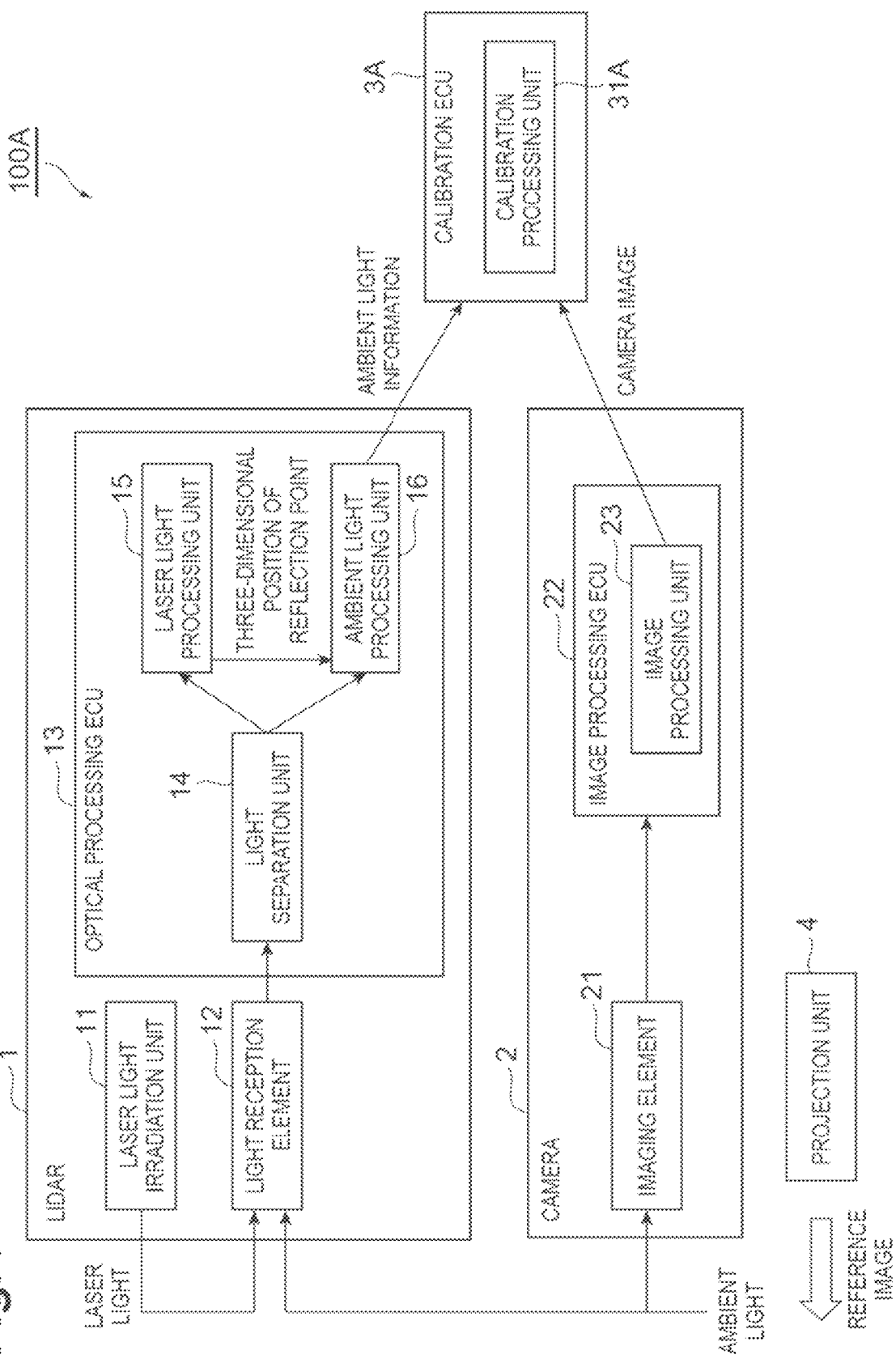

OBJECT DETECTION APPARATUS

CROSS-REFERENCE TO RELATED APPLICATION

This application claims the benefit of priority from Japanese Patent Application No. 2020-181693, filed on Oct. 29, 2020, the entire contents of which are incorporated herein by reference.

TECHNICAL FIELD

The present disclosure relates to an object detection apparatus.

BACKGROUND

For example, the autonomous driving vehicle is equipped with a LIDAR that detects an object target based on the reflection light of the irradiated laser light in order to detect the surrounding object target. Further, for example, as described in the following non-patent literatures, a LIDAR, which detects an object target by using the reflection light of the irradiated laser light and the result of light reception of the reflection light of the ambient light other than the irradiated laser light, has been developed.

Non-Patent Literatures: Seigo Ito, Masayoshi Hiratsuka, Mitsuhiko Ota, Hiroyuki Matsubara, Masaru Ogawa "Localization Method based on Small Imaging LIDAR and DCNN" Information Processing Society of Japan, The 79th National Convention Lecture Proceedings

SUMMARY

The autonomous driving vehicles may be equipped with a camera in addition to the LIDAR to detect surrounding object targets. In such a case, the LIDAR and the camera are calibrated, and the object target is detected based on the detection results of both. Here, as described above, there is a LIDAR that detects an object target by using the result of light reception of the reflection light of the ambient light other than the irradiated laser light. Even in a case where such a LIDAR is mounted in addition to the camera, it is necessary to perform calibration of both accurately.

Therefore, the present disclosure describes a LIDAR capable of detecting not only the reflection light of the irradiated laser light but also the reflection light of the ambient light, and an object detection apparatus capable of accurately calibrating the camera.

According to an aspect of the present disclosure, there is provided an object detection apparatus that detects an object target by using a LIDAR and a camera, the object detection apparatus including a calibration processing unit configured to perform calibration of the LIDAR and the camera. The LIDAR includes a light reception unit configured to receive reflection light of irradiated laser light and reflection light of ambient light which is light other than the laser light and to detect an intensity of the received reflection light of the ambient light, and the calibration processing unit is configured to perform the calibration, based on a result of light reception of the reflection light of the ambient light received by the light reception unit and a camera image captured by the camera.

In the object detection apparatus, the calibration processing unit is configured to perform the calibration, based on a result of light reception of the reflection light of the ambient light received by the LIDAR and the camera image of the camera. That is, the object detection apparatus performs calibration of the LIDAR and the camera, based on the same type of information as the result of light reception of the reflection light of the ambient light and the camera image. Therefore, the object detection apparatus is able to accurately perform calibration of the camera and the LIDAR capable of detecting the reflection light of the ambient light in addition to the reflection light of the irradiated laser light.

In the object detection apparatus, the LIDAR further may include an association information generation unit that generates association information in which a position of a reflection point of the received reflection light of the laser light is associated with the intensity of the received reflection light of the ambient light, and the calibration processing unit may perform the calibration, based on the association information generated by the association information generation unit and the camera image. In such a case, the calibration can be performed accurately, based on the camera image and the generated association information.

In the object detection apparatus, the association information may include a time of light reception of the reflection light of the ambient light used to generate the association information, the camera image includes a time of imaging of the camera image, and the calibration processing unit may be configured to perform the calibration by using the association information and the camera image in which a difference between the time of light reception and the time of imaging is a predetermined time or less. For example, in a case where the object detection apparatus is mounted on the vehicle, the object detection apparatus moves as the vehicle moves. Thereby, in a case where the time when the reflection light of the ambient light is received and the time when the camera image is captured are far apart, the appearance of the same object target is greatly different. As a result, calibration cannot be accurately performed using the ambient light information and the camera image. Therefore, the object detection apparatus is able to perform the calibration with higher accuracy by performing the calibration using the association information and the camera image in which the difference between the time of light reception and the time of imaging is a predetermined time or less.

The object detection apparatus further includes a projection unit configured to project a reference image within a projection region in front of the LIDAR and the camera. The LIDAR irradiates an inside of an irradiation region including the projection region with the laser light, and receives the reflection light of the irradiated laser light and the reflection light of the ambient light, the camera performs imaging of an inside of the imaging region including the projection region, and the calibration processing unit performs the calibration, based on the result of light reception of the reflection light of the ambient light reflected in the irradiation region received by the light reception unit and the camera image in the imaging region captured by the camera. In such a case, based on the reflection light of the ambient light including the reference image and the camera image including the reference image, the object detection apparatus is able to perform calibration of the LIDAR and the camera more accurately using the reference image included in both the reflection light and the camera image.

According to the aspect of the present disclosure, it is possible to accurately perform calibration of the camera with the LIDAR capable of detecting the reflection light of the ambient light in addition to the reflection light of the irradiated laser light.

BRIEF DESCRIPTION OF THE DRAWINGS

FIG. 4 is a block diagram showing an example of the object detection apparatus according to a second embodiment.

DETAILED DESCRIPTION

Figure 1:
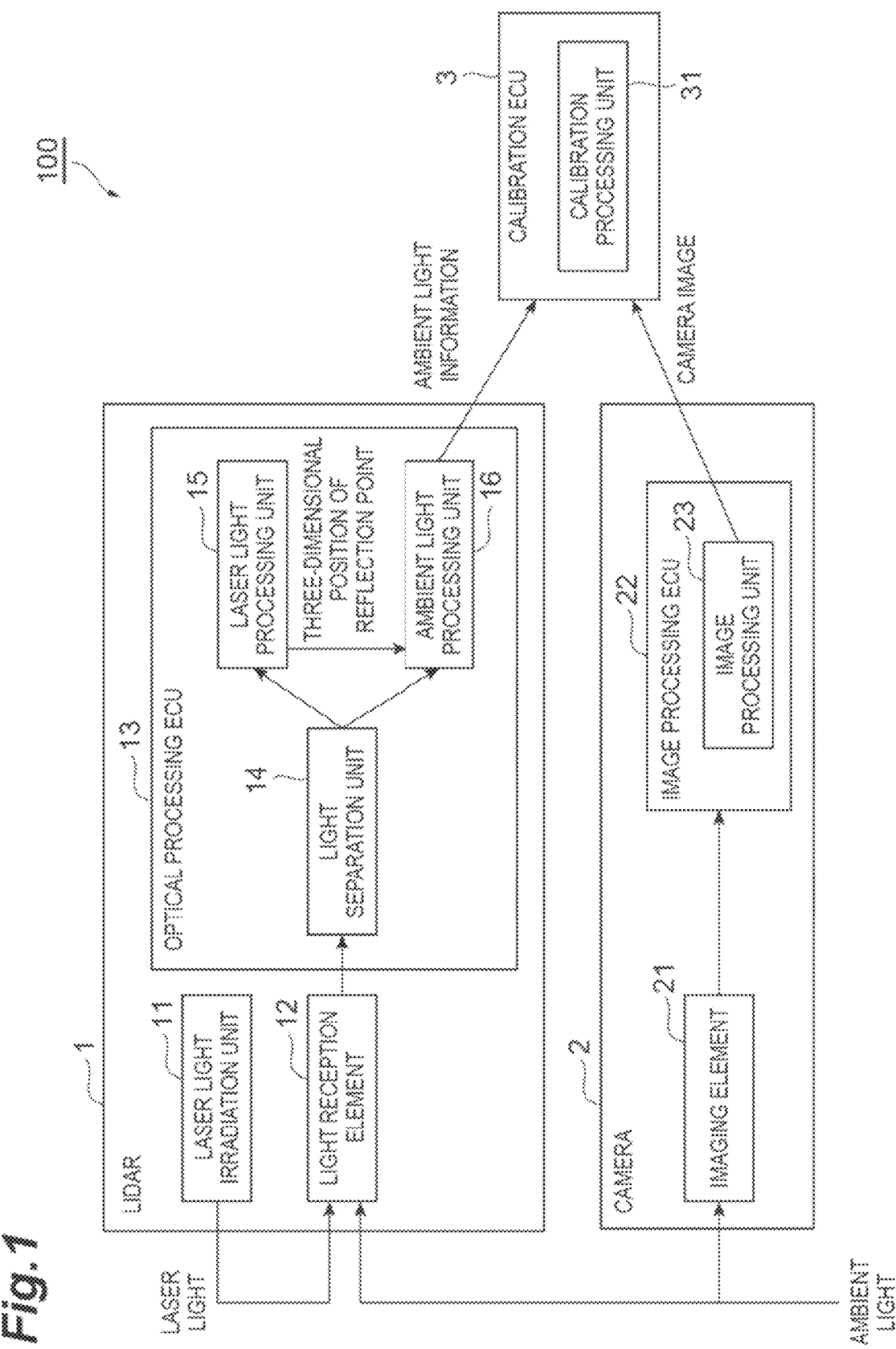
FIG. 1 is a block diagram showing an example of an object detection apparatus according to a first embodiment.

Hereinafter, exemplary embodiments will be described, with reference to the drawings. In each drawing, the same or corresponding elements are represented by the same reference numerals, and repeated description will not be given.

First Embodiment

First, a first embodiment of the object detection apparatus will be described. The object detection apparatus 100 according to the first embodiment shown in FIG. 1 is mounted on a vehicle (host vehicle) and detects an object target around the host vehicle. The object target detected by the object detection apparatus 100 can be used for various controls such as autonomous driving of the host vehicle. The object detection apparatus 100 includes a light detection and ranging (LIDAR) 1, a camera 2, and a calibration electronic control unit (ECU) 3. The object detection apparatus 100 detects the object target around the vehicle by using the LIDAR 1 and the camera 2. Further, the object detection apparatus 100 has a function of calibrating the LIDAR 1 and the camera 2.

The LIDAR 1 irradiates the surroundings of the host vehicle with laser light, and receives the reflection light (reflection light of the laser light) reflected by the irradiated laser light on the object target. Further, the LIDAR 1 detects the intensity of the reflection light of the laser light. In addition to the reflection light of the irradiated laser light, the LIDAR 1 in the present embodiment is able to receive the reflection light (reflection light of the ambient light) reflected by the ambient light, which is the light other than the irradiated laser light, on the object target. Further, the LIDAR 1 is able to detect the intensity of the received reflection light of the ambient light. The ambient light is, for example, sunlight and light around the host vehicle such as lighting.

More specifically, the LIDAR 1 includes a laser light irradiation unit 11, a light reception element 12, and an optical processing ECU 13. The laser light irradiation unit 11 illuminates laser light toward each position in a predetermined irradiation region around the host vehicle on which the object detection apparatus 100 is mounted.

The light reception element 12 is able to receive the reflection light of the laser light illuminated from the laser light irradiation unit 11 and output a signal corresponding to the intensity of the received reflection light of the laser light. Further, the light reception element 12 is able to receive the reflection light of the ambient light other than the laser light illuminated from the laser light irradiation unit 11, and output a signal corresponding to the intensity of the received reflection light of the ambient light.

The optical processing ECU 13 is an electronic control unit which has a CPU, ROM, RAM, and the like. The optical processing ECU 13 realizes various functions by loading, for example, the programs recorded in the ROM into the RAM and executing the programs loaded in the RAM in the CPU. The optical processing ECU 13 may be composed of a plurality of electronic units.

The optical processing ECU 13 detects each of the intensity of the reflection light of the laser light received by the light reception element 12 and the intensity of the reflection light of the ambient light, based on the output signal of the light reception element 12. The optical processing ECU 13 functionally includes a light separation unit 14, a laser light processing unit 15, and an ambient light processing unit (association information generation unit) 16. In such a manner, the light reception element 12, the light separation unit 14, the laser light processing unit 15, and the ambient light processing unit 16 receive the reflection light of the laser light and the reflection light of the ambient light, and functions as a light reception unit that is able to detect the intensity of each received reflection light.

The light separation unit 14 separates the light received by the light reception element 12 into the reflection light of the laser light and the reflection light of the ambient light. For example, the light separation unit 14 is able to discriminate light having a specific flickering pattern as reflection light of laser light, and discriminate other light as reflection light of ambient light. Further, for example, the light separation unit 14 is able to discriminate the light, which is received within a predetermined time after the laser light irradiation unit 11 illuminates the laser light, as the reflection light of the laser light, and discriminate the light received at other timings as reflection light of ambient light. The predetermined time is set, in advance, based on the time from in a case where the laser light irradiation unit 11 illuminates the laser light until the irradiated laser light is reflected by the object target around the host vehicle and the reflection light of the laser light reaches the light reception element 12. As mentioned above, the reflection light of the ambient light does not include the reflection light of the laser light illuminated from the LIDAR 1. However, in a case where the ambient light includes light having the same wavelength as the laser light, the reflection light of the ambient light includes the reflection light of the light having the same wavelength as the laser light.

The laser light processing unit 15 generates laser light information (point cloud of laser light), based on the result of light reception of the reflection light of the laser light received by the light reception element 12. The laser light information is generated, based on the result of light reception of a plurality of laser light beams (result of light receptions of a plurality of reflection light beams) irradiated toward each position in a predetermined irradiation region. After the laser light irradiation is completed for all the positions in the irradiation region, the LIDAR 1 again illuminates the laser light toward each position in the irradiation region. In such a manner, the LIDAR 1 performs the next irradiation processing again after the irradiation processing of irradiating all the positions in the irradiation region with the laser light is completed. The laser light information is generated each time the LIDAR 1 performs the irradiation processing.

More specifically, the laser light processing unit 15 generates laser light point information by associating the three-dimensional position of the reflection point of the irradiated laser light with the intensity of the laser light for each of the plurality of laser light beams to be irradiated toward the irradiation region. The laser light processing unit 15 generates laser light information based on the plurality of generated laser light point information. The laser light processing unit 15 is able to measure the three-dimensional position of the reflection point of the laser light, based on the irradiation angle of the laser light illuminated from the laser light irradiation unit 11 and the arrival time from the irradiation of the laser light until the reflection light of the laser light reaches the light reception element 12.

The ambient light processing unit 16 generates ambient light information (point cloud of ambient light), based on the result of light reception of the reflection light of the ambient light received by the light reception element 12. The ambient light information is generated every time the LIDAR 1 performs irradiation processing of illuminating a plurality of laser light beams into the irradiation region, similarly to the laser light information.

More specifically, first, the ambient light processing unit 16 acquires the three-dimensional position of the reflection point of the laser light from the laser light processing unit 15. Here, in a state where the state of each part of the LIDAR 1 such as the irradiation angle of the laser light is not changed, the position of the reflection point of the laser light received by the light reception element 12 and the position of the reflection point of the ambient light are the same as each other. Therefore, the LIDAR 1 detects the intensity of the reflection light of the ambient light in the state in a case where the reflection light of the laser light is received. Thereby, it is possible to detect the intensity of the reflection light of the ambient light reflected at the same position as the reflection point of the laser light. Therefore, the ambient light processing unit 16 generates the ambient light point information by associating the three-dimensional position of the reflection point of the laser light acquired from the laser light processing unit 15 with the intensity of the reflection light of the ambient light received by the light reception element 12. The ambient light point information is generated for each of a plurality of laser light beams emitted toward the irradiation region.

The ambient light processing unit 16 generates ambient light information, based on the plurality of generated ambient light point information. That is, the ambient light processing unit 16 generates ambient light information (association information) in which the position of the reflection point of the received reflection light of the laser light (ambient light) is associated with the intensity of the received reflection light of the ambient light at each position of the reflection point.

In such a manner, the LIDAR 1 is able to generate laser light information and ambient light information, based on the result of light reception of the light reception element 12. That is, the LIDAR 1 is able to generate the laser light information and the ambient light information, based on the result of light reception of one light reception element 12. Therefore, it is not necessary to perform calibration of the laser light information and the ambient light information.

The object detection apparatus 100 detects the object target, based on the laser light information generated by the LIDAR 1. Further, the object detection apparatus 100 may detect the object target by using the ambient light information generated by the LIDAR 1 in addition to the laser light information.

The camera 2 performs imaging of an inside of a predetermined imaging region around the host vehicle and generates a camera image which is a result of the imaging. The camera 2 includes an imaging element 21 and an image processing ECU 22. The imaging element 21 is able to receive the reflection light of the ambient light reflected in the imaging region and output a signal corresponding to the received reflection light of the ambient light.

The image processing ECU 22 is an electronic control unit having the same configuration as the optical processing ECU 13. The image processing ECU 22 functionally includes an image processing unit 23. The image processing unit 23 generates a camera image by a well-known method, based on the output signal of the imaging element 21.

The calibration ECU 3 is an electronic control unit which has the same configuration as the optical processing ECU 13. The calibration ECU 3 may be integrally configured with the optical processing ECU 13 or the image processing ECU 22. The calibration ECU 3 functionally includes a calibration processing unit 31.

The calibration processing unit 31 performs calibration of the LIDAR 1 and the camera 2. More specifically, the calibration processing unit 31 performs calibration, based on the result of light reception (ambient light information) of the reflection light of the ambient light received by the LIDAR 1 and the camera image captured by the camera 2. The calibration described herein is to align the LIDAR 1 and the camera 2 and calculate the positional correspondence relationship between the LIDAR 1 and the camera 2.

Here, the calibration processing unit 31 calculates, for example, external parameters of the LIDAR 1 and the camera 2 through calibration between the LIDAR 1 and the camera 2. The external parameters represent the positional correspondence relationship between the LIDAR 1 and the camera 2. The calibration processing unit 31 generates external parameters, based on one ambient light information and one camera image.

Specifically, the calibration processing unit 31 performs conversion processing of performing conversion on either one data or both data of the ambient light information and the camera image by using the initial values of the external parameters generated randomly or generated based on the predetermined conditions. Next, the calibration processing unit 31 calculates the similarity between the ambient light information and the camera image, based on the ambient light information and the camera image obtained after the conversion processing is performed. Then, the calibration processing unit 31 updates the external parameters such that the similarity increases. The calibration processing unit 31 repeatedly updates the external parameters until the predetermined number of times or the similarity is greater than the predetermined similarity threshold value. In a case where the update of the external parameters is completed, the calibration processing unit 31 outputs the external parameters for which the update is completed as a result of calibration. The object detection apparatus 100 is able to recognize the positional correspondence relationship between the LIDAR 1 and the camera 2, based on the calculated external parameters.

Here, the ambient light information and the camera image, which is used in a case where the calibration processing unit 31 performs the calibration, will be described. The ambient light information includes the time of light reception of the reflection light of the ambient light used to generate the ambient light information, and the camera image includes the time of imaging of the camera image. In a case of extracting the ambient light information and the camera image to be calibrated, the calibration processing unit 31 extracts the ambient light information and the camera image in which the difference between the time of light reception included in the ambient light information and the time of imaging included in the camera image is not greater than a predetermined time. The calibration processing unit 31 is able to perform calibration as described above using the extracted ambient light information and the extracted camera image.

Next, an example of various methods of calculating the external parameters performed by the calibration processing unit 31 will be described.

First Method

First, a first method of calculating the external parameters will be described. In the first method, the calibration processing unit 31 calculates the external parameters by using the histogram of the image.

(1) The calibration processing unit 31 converts the ambient light information into an "image of which the pixel value is the intensity of the reflection light of the ambient light" based on, for example, the following projection matrix and conversion expression. Hereinafter, the "image of which the pixel value is the intensity of the reflection light of the ambient light" generated by conversion of the ambient light information is referred to as a "LIDAR ambient light image". Then, the calibration processing unit 31 cuts out the LIDAR ambient light image such that the image has the same size (width×height) as the camera image.

$$\text{Projection Matrix } P = \overbrace{\begin{pmatrix} f_x & s & c_x & 0 \\ 0 & f_y & c_y & 0 \\ 0 & 0 & 1 & 0 \\ \hline 0 & 0 & 0 & 1 \end{pmatrix}}^{\text{Internal Parameter}} \overbrace{\begin{pmatrix} & & & t_x \\ & R & & t_y \\ & & & t_z \\ \hline 0 & 0 & 0 & 1 \end{pmatrix}}^{\text{Position and Orientation Parameter}}$$

$$\text{2-Dimensional Conversion:} \begin{bmatrix} X \\ Y \\ Z \end{bmatrix} = P \cdot \begin{bmatrix} P_x \\ P_y \\ P_z \end{bmatrix}, \quad X' = X/Z,\ Y' = Y/Z$$

(2) Next, the calibration processing unit 31 converts the camera image into a grayscale image.

(3) The calibration processing unit 31 converts the LIDAR ambient light image and the camera image, which is converted into the grayscale image, into histograms, respectively. The calibration processing unit 31 uses the similarity of the histogram as a score, and performs optimization calculation while performing conversion of the external parameter (position and orientation parameter) such that the similarity is high. This score can be calculated, for example, by the amount of mutual information between the two histograms.

Second Method

A second method of calculating the external parameters will be described. In the second method, the calibration processing unit 31 processes the image through image processing and calculates the external parameters by calculating the similarity with the pixel level.

(1) The calibration processing unit 31 converts the ambient light information into a LIDAR ambient light image in the same manner as Processing (1) of the first method described above.

Figure 2A:
FIG. 2A is a diagram showing a LIDAR ambient light image.
Figure 2B:
FIG. 2B is a diagram showing an example of an image of the LIDAR ambient light image obtained after image processing.

(2) Next, the calibration processing unit 31 performs the image processing on the LIDAR ambient light image. Here, various examples of the image processing method will be described. For example, as shown in FIG. 2A, there is a LIDAR ambient light image showing an appearance of the front side of the host vehicle. Through a first image processing method, the calibration processing unit 31 performs binarization processing on the LIDAR ambient light image shown in FIG. 2A. Thereby, as shown in FIG. 2B, a binarized image may be generated. The calibration processing unit 31 may perform multi-value processing other than binarization.

Figure 2C:
FIG. 2C is a diagram showing an example of an image of the LIDAR ambient light image obtained after image processing.
Figure 3A:
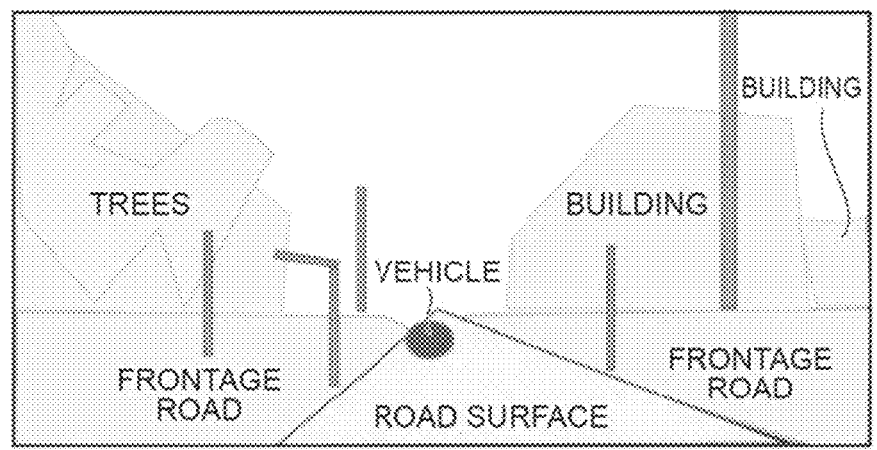
FIG. 3A is a diagram showing an example of an image of the LIDAR ambient light image obtained after image processing.
Figure 3B:
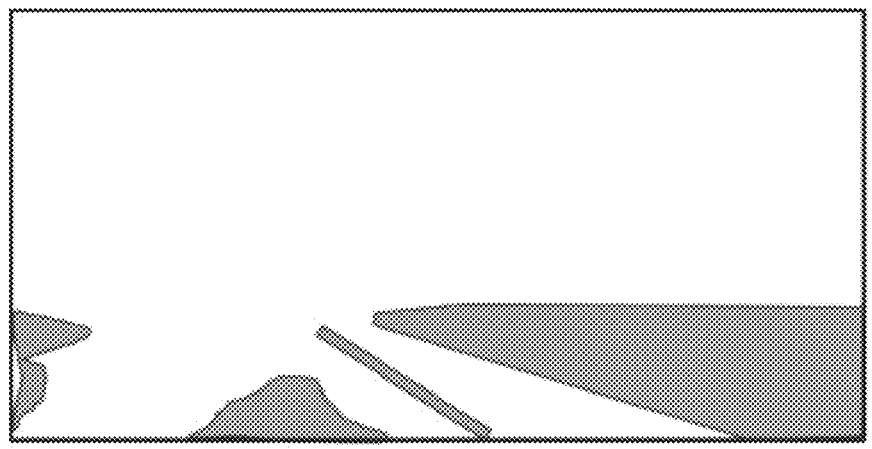
FIG. 3B is a diagram showing an example of an image of the LIDAR ambient light image obtained after image processing.

Further, through a second image processing method, the calibration processing unit 31 performs edge detection processing on the LIDAR ambient light image shown in FIG. 2A. Thereby, as shown in FIG. 2C, an image in which the edge portion is highlighted may be generated. Through a third image processing method, the calibration processing unit 31 performs semantic segmentation processing on the LIDAR ambient light image shown in FIG. 2A. Thereby, as shown in FIG. 3A, an image segmented into regions may be generated for each attribute. Through a fourth image processing method, the calibration processing unit 31 extracts only a shadow region portion from the LIDAR ambient light image shown in FIG. 2A and performs segmentation processing. Thereby, as shown in FIG. 3B, an image in which only the shadow region portion is segmented into regions may be generated. By segmenting only the shadow portion into regions in such a manner, there are many places where the breaks in the regions are linear, and the image matching processing is easy.

(3) The calibration processing unit 31 performs the same image processing as in (2) on the camera image.

(4) The calibration processing unit 31 calculates the difference between the LIDAR ambient light image obtained after image processing and the camera image obtained after image processing. The calibration processing unit 31 performs the optimization calculation while performing conversion of the external parameters (position and orientation parameters) such that the calculated difference is small. For example, the calibration processing unit 31 is able to calculate the difference between the LIDAR ambient light image and the camera image using the expression, and perform the optimization calculation such that the loss is reduced.

$$\text{loss} = \Sigma_w \Sigma_h (\text{camera image }[h][w] - \text{LIDAR ambient light image }[h][w])^2$$

Here, "w" is a position in the width direction in the image, and "h" is a position in the height direction in the image. Here, the calibration processing unit 31 calculates the similarity between the two images in accordance with the method used for the image processing, and performs the optimization calculation. For example, the calibration processing unit 31 is able to calculate the similarity, based on the numerical difference for each pixel in a case where a value is given to each pixel through binarization, and is able to calculate the similarity, based on the matching or mismatching of the attributes in a case where an attribute is attached to each pixel.

Further, the calibration processing unit 31 may use a mapping table of the ambient light information and the camera image at the pixel level as an external parameter. The mapping table is, for example, a map showing which pixel in the camera image corresponds to a certain point (information of a certain reflection point) of ambient light information. The calibration processing unit 31 is able to create the mapping table as follows, for example.

(1) First, the calibration processing unit 31 corrects a value of reflection intensity of the ambient light information. For example, the calibration processing unit 31 may perform gamma correction on the value of reflection intensity.

(2) Next, the calibration processing unit 31 converts the camera image into a grayscale image.

(3) The calibration processing unit 31 picks up pixels of the camera image that are close to the value of the reflection intensity at each point of the ambient light information.

(4) The calibration processing unit 31 searches for a pair of a point of ambient light information and a pixel of the camera image without breaking the positional relationship of each point in the ambient light information, based on the pixels of the picked up camera image. For example, the calibration processing unit 31 determines that the pair is not established in a case where the point A of the ambient light information is on the left side of the point B but the pixel A of the corresponding camera image is on the right side of the pixel B.

(5) In a case where the calibration processing unit 31 is able to search for a pair having a pair threshold value equal to or higher than the predetermined pair threshold value in (4), the calibration processing unit 31 creates a mapping table, based on the positional relationship of the pair. In a case where the pair that is equal to or larger than the pair threshold value cannot be searched, the calibration processing unit 31 relaxes the pickup condition of (3) and searches for the pair again. By relaxing the pickup condition, for example, the calibration processing unit 31 relaxes a "predetermined range" of the following: "the calibration processing unit 31 determines that the pixels are the same (close) in a case where the pixel values thereof are within the predetermined range and picks up the pixels".

Further, the calibration processing unit 31 may generate a projection matrix for converting the coordinate system of the LIDAR 1 into the coordinate system of the camera 2 from the mapping table created by the above method.

As described above, in the object detection apparatus 100, the calibration processing unit 31 performs calibration of the LIDAR 1 and the camera 2, based on the result of light reception of the reflection light of the ambient light received by the LIDAR 1 and the camera image of the camera 2. That is, the object detection apparatus 100 performs calibration of the LIDAR 1 and the camera 2, based on the same type of information as the result of light reception of the reflection light of the ambient light and the camera image. Therefore, the object detection apparatus 100 is able to accurately perform calibration of the camera 2 and the LIDAR 1 capable of detecting the reflection light of the ambient light in addition to the reflection light of the irradiated laser light.

The ambient light processing unit 16 of the LIDAR 1 generates ambient light information (association information) in which the position of the reflection point of the received reflection light of the laser light and the intensity of the reflection light of the ambient light are associated with each other. The calibration processing unit 31 performs calibration, based on the generated ambient light information and the camera image. In such a case, the object detection apparatus 100 is able to accurately perform calibration based on the camera image and the ambient light information associated with the intensity of the reflection light for each position of the reflection point of the reflection light.

The calibration processing unit 31 performs calibration using the camera image and the ambient light information in which the difference between the time of light reception of the reflection light of the ambient light included in the ambient light information and the time of imaging at which the camera image is captured is equal to or less than a predetermined time. For example, in a case where the object detection apparatus 100 is mounted on a vehicle, the object detection apparatus 100 also moves as the vehicle moves. Thereby, in a case where the time when the reflection light of the ambient light is received and the time when the camera image is captured are far apart, the appearance of the same object target is greatly different. As a result, calibration cannot be accurately performed using the ambient light information and the camera image. Therefore, the object detection apparatus 100 performs the calibration by using the camera image and the ambient light information in which the difference between the time of light reception and the time of imaging is equal to or less than a predetermined time. In such a manner, it is possible to perform the calibration with higher accuracy.

Second Embodiment

Next, a second embodiment of the object detection apparatus will be described. In the following, the differences from the object detection apparatus 100 according to the first embodiment will be mainly described. The corresponding elements are represented by the same reference numerals, and detailed description thereof will not be repeated. As shown in FIG. 4, the object detection apparatus 100A according to the second embodiment performs calibration of the LIDAR 1 and the camera 2 by using the projected reference image. The object detection apparatus 100A includes a LIDAR 1, a camera 2, a calibration ECU 3A, and a projection unit 4.

The projection unit 4 projects the reference image into the projection region in front of the LIDAR 1 and the camera 2. The reference image may be, for example, predetermined numbers, characters, drawings, or the like. The LIDAR 1 irradiates the inside of the irradiation region including the projection region on which the reference image is projected with the laser light, and receives the reflection light of the irradiated laser light and the reflection light of the ambient light. The ambient light here also includes the reflection light of the reference image illuminated from the projection unit 4. The camera 2 performs imaging of an inside of the imaging region including the projection region on which the reference image is projected.

The calibration ECU 3A includes a calibration processing unit 31A. The calibration processing unit 31A performs calibration of the LIDAR 1 and the camera 2 by using the same method as in the first embodiment, based on the result (ambient light information) of light reception of the reflection light of the ambient light reflected in the irradiation region received by the LIDAR 1 and the camera image in the imaging region captured by the camera 2. That is, the calibration processing unit 31A performs calibration, based on the ambient light information including the effect of the reference image and the camera image including the reference image. Here, the reference image is included in both the ambient light information and the camera image. Thus, the calibration processing unit 31A is able to calculate the similarity between the two based on the reference image and perform the calibration. The LIDAR 1 in the present embodiment is able to detect the reflection light of the ambient light in addition to the reflection light of the laser light. Therefore, the calibration processing unit 31A is able to perform calibration using the ambient light information including the reference image illuminated from the projection unit 4.

As described above, the object detection apparatus 100A in the present embodiment includes a projection unit 4 that projects a reference image. In such a case, the object detection apparatus 100A is able to perform calibration of the LIDAR and the camera with higher accuracy by using the reference images included in the ambient light information including the reference image and the camera image including the reference image, based on the ambient light information and the camera image.

The projection unit 4 may periodically change the reference image to be projected. In such a case, it is possible to obtain the camera image and the ambient light information including the reference image different from that in the previous time without moving the vehicle, on which the object detection apparatus 100A is mounted, or moving the camera 2 or the like. Further, the projection unit 4 may project a reference image which is suitable for the calibration processing unit 31A to perform calibration. In such a case, the calibration processing unit 31A is able to perform the calibration with higher accuracy.

Further, the projection unit 4 may project a reference image in which time information is embedded. The projection unit 4 may project, for example, a reference image in which a number and a QR code (registered trademark) are embedded as time information. Further, the projection unit 4 switches the reference image, in which the time information is embedded, at a cycle equal to or less than the cycle of irradiation (irradiation processing cycle) of the LIDAR 1 or the cycle of imaging of the camera 2.

Here, in the LIDAR 1, there is a data transfer delay between the light reception element 12 and the optical processing ECU 13. Further, also in the camera 2, there is a data transfer delay between the imaging element 21 and the image processing ECU 22. Therefore, in a case where the data transfer delay in the LIDAR 1 is T1 and the data transfer delay in the camera 2 is T2, the position of the object target does not match when the ambient light information and the camera image are compared unless the time correction of |T1−T2| is taken into consideration. Therefore, the calibration processing unit 31A is able to compare the ambient light information and the camera image in consideration of the data transfer delay in each of the LIDAR 1 and the camera 2 based on the embedded time information by using the camera image and the ambient light information including the reference image in which the time information is embedded. As a result, the calibration processing unit 31A is able to perform the calibration with higher accuracy.

Although the embodiments of the present disclosure have been hitherto described above, the present disclosure is not limited to the above embodiment. The present disclosure may be modified in various ways without departing from the spirit of the present disclosure.

What is claimed is:

1. An object detection apparatus that detects an object target by using a LIDAR and a camera, the object detection apparatus comprising
   a calibration processing unit configured to perform calibration of the LIDAR and the camera,
   wherein the LIDAR includes a light reception unit configured to receive reflection light of irradiated laser light and reflection light of ambient light which is light other than the laser light and to detect an intensity of the received reflection light of the ambient light, and
   the calibration processing unit is configured to perform the calibration, based on a result of light reception of the reflection light of the ambient light received by the light reception unit and a camera image captured by the camera,
   wherein the LIDAR further includes an association information generation unit that generates association information in which a position of a reflection point of the received reflection light of the laser light is associated with the intensity of the received reflection light of the ambient light, and
   wherein the calibration processing unit performs the calibration, based on the association information generated by the association information generation unit and the camera image,
   wherein the association information includes a time of light reception of the reflection light of the ambient light used to generate the association information,
   wherein the camera image includes a time of imaging of the camera image,
   wherein the calibration processing unit is configured to perform the calibration by using the association information and the camera image in which a difference between the time of light reception and the time of imaging is a predetermined time or less, and
   wherein the calibration processing unit is configured to use a time corrected based on a transfer delay of the data of the reflection light of the ambient light within the LIDAR and a transfer delay of the data of the camera image within the camera as the time of light reception and the time of imaging.

2. The object detection apparatus according to claim 1, further comprising a projection unit configured to project a reference image within a projection region in front of the LIDAR and the camera,
   wherein the LIDAR irradiates an inside of an irradiation region including the projection region with the laser light, and receives the reflection light of the irradiated laser light and the reflection light of the ambient light,
   the camera performs imaging of an inside of the imaging region including the projection region, and
   the calibration processing unit performs the calibration, based on the result of light reception of the reflection light of the ambient light reflected in the irradiation region received by the light reception unit and the camera image in the imaging region captured by the camera.

3. The object detection apparatus according to claim 1, wherein the time is corrected based on a difference between the transfer delay of the data of the reflection light of the ambient light within the LIDAR and the transfer delay of the data of the camera image within the camera.

* * * * *